(12) United States Patent
Kwong et al.

(10) Patent No.: US 11,210,199 B2
(45) Date of Patent: Dec. 28, 2021

(54) SAFETY MONITOR FOR INVALID IMAGE TRANSFORM

(71) Applicant: ATI Technologies ULC, Markham (CA)

(72) Inventors: Tung Chuen Kwong, Richmond Hill (CA); Benjamin Koon Pan Chan, Markham (CA); Clarence Ip, Unionville (CA); Meghana Manjunatha, North York (CA)

(73) Assignee: ATI Technologies ULC, Markham (CA)

( * ) Notice: Subject to any disclaimer, the term of this patent is extended or adjusted under 35 U.S.C. 154(b) by 272 days.

(21) Appl. No.: 16/427,941

(22) Filed: May 31, 2019

(65) Prior Publication Data

US 2020/0379877 A1 Dec. 3, 2020

(51) Int. Cl.
*G06F 11/00* (2006.01)
*G06F 11/36* (2006.01)
(Continued)

(52) U.S. Cl.
CPC ...... *G06F 11/3604* (2013.01); *G06F 11/3003* (2013.01); *G06T 1/0014* (2013.01);
(Continued)

(58) Field of Classification Search
CPC ..... G06T 7/001; G06T 7/0002; G06T 1/0014; G06T 1/0021; G06T 3/4038; G06F 11/3604; G06F 11/3003
See application file for complete search history.

(56) References Cited

U.S. PATENT DOCUMENTS

| 5,657,420 A | 8/1997 | Jacobs et al. |
| 6,067,287 A | 5/2000 | Chung-Ju et al. |

(Continued)

FOREIGN PATENT DOCUMENTS

| EP | 3098762 A1 | 11/2016 |
| EP | 3475875 A1 | 5/2019 |

(Continued)

OTHER PUBLICATIONS

Appendix 1 to the Oct. 2019 Update: Subject Matter Eligibility, pp. 1-41 (Year: 2019).*

(Continued)

*Primary Examiner* — Jonathan D Gibson
(74) *Attorney, Agent, or Firm* — Kowert Hood Munyon Rankin and Goetzel PC; Rory D. Rankin

(57) ABSTRACT

Systems, apparatuses, and methods for implementing a safety monitor framework for a safety-critical computer vision (CV) application are disclosed. A system includes a safety-critical CV application, a safety monitor, and a CV accelerator engine. The safety monitor receives an input image, test data, and a CV graph from the safety-critical CV application. The safety monitor generates a modified image by adding additional objects outside of the input image. The safety monitor provides the modified image and CV graph to the CV accelerator which processes the modified image and provides outputs to the safety monitor. The safety monitor determines the likelihood of erroneous processing of the original input image by comparing the outputs for the additional objects with a known good result. The safety monitor complements the overall fault coverage of the CV accelerator engine and covers faults only observable at the level of the CV graph.

20 Claims, 8 Drawing Sheets

(51) Int. Cl.
  *G06T 3/40* (2006.01)
  *G06T 1/00* (2006.01)
  *G06F 11/30* (2006.01)
  *G06T 7/00* (2017.01)

(52) U.S. Cl.
  CPC ............ *G06T 3/4038* (2013.01); *G06T 7/001* (2013.01); *G06T 7/0002* (2013.01)

(56) References Cited

U.S. PATENT DOCUMENTS

| | | | |
|---|---|---|---|
| 6,215,915 B1* | 4/2001 | Reyzin .................. G06T 3/00 | 345/648 |
| 6,295,374 B1* | 9/2001 | Robinson ............... G06K 9/036 | 348/95 |
| 6,678,404 B1* | 1/2004 | Lee ........................ G06T 7/001 | 382/143 |
| 8,131,660 B2 | 3/2012 | Davis et al. | |
| 8,345,979 B2* | 1/2013 | Davis .................. G06K 9/6206 | 382/181 |
| 8,369,595 B1 | 2/2013 | Derakhshani et al. | |
| 9,319,137 B2 | 4/2016 | Zhuge et al. | |
| 9,501,811 B2* | 11/2016 | Michel ..................... G06T 3/40 | |
| 10,078,794 B2 | 9/2018 | Pierce et al. | |
| 10,339,622 B1* | 7/2019 | Tang ...................... G06T 7/001 | |
| 10,438,091 B2 | 10/2019 | Li | |
| 10,762,392 B2 | 9/2020 | Zhang et al. | |
| 2003/0086616 A1* | 5/2003 | Oh ........................ G06T 7/0002 | 382/209 |
| 2004/0263911 A1* | 12/2004 | Rodriguez ............ G06T 1/0021 | 358/3.28 |
| 2007/0036420 A1* | 2/2007 | Enachescu ............. G09G 3/006 | 382/141 |
| 2015/0178246 A1 | 6/2015 | Herrero Abellanas et al. | |
| 2015/0178889 A1* | 6/2015 | Michel ..................... G06T 3/40 | 382/298 |
| 2015/0206337 A1 | 7/2015 | Roimela | |
| 2015/0358755 A1 | 12/2015 | Luo et al. | |
| 2016/0062294 A1 | 3/2016 | Murashima | |
| 2016/0179434 A1 | 6/2016 | Herrero Abellanas et al. | |
| 2016/0245178 A1* | 8/2016 | Bhabhrawala .......... G06T 7/001 | |
| 2017/0206415 A1* | 7/2017 | Redden .................... G06T 7/593 | |
| 2017/0316312 A1 | 11/2017 | Goyal et al. | |
| 2018/0018864 A1 | 1/2018 | Baker | |
| 2018/0032859 A1 | 2/2018 | Park et al. | |
| 2018/0068429 A1* | 3/2018 | Tan ......................... G06N 3/084 | |
| 2018/0189641 A1 | 7/2018 | Boesch et al. | |
| 2018/0218303 A1 | 8/2018 | Cole et al. | |
| 2018/0330166 A1* | 11/2018 | Redden ................. G06T 7/0002 | |
| 2018/0373941 A1 | 12/2018 | Kwant et al. | |
| 2019/0028752 A1 | 1/2019 | Zhang et al. | |
| 2019/0050685 A1* | 2/2019 | Kaminski ............. G06K 9/6261 | |
| 2019/0147332 A1 | 5/2019 | Lagudu et al. | |
| 2019/0164265 A1* | 5/2019 | Liao ........................ G06T 5/006 |
| 2019/0258251 A1* | 8/2019 | Ditty .................. G06K 9/00805 |
| 2019/0325305 A1 | 10/2019 | Zhang et al. | |
| 2020/0005422 A1* | 1/2020 | Subramanian ........ G06T 1/0014 |
| 2020/0134432 A1 | 4/2020 | Lagudu et al. | |
| 2020/0302285 A1 | 9/2020 | Wang et al. | |
| 2020/0380383 A1 | 12/2020 | Kwong et al. | |

FOREIGN PATENT DOCUMENTS

| | | |
|---|---|---|
| WO | 2017003887 A1 | 1/2017 |
| WO | 2017075939 A1 | 5/2017 |
| WO | 2019094843 A1 | 5/2019 |

OTHER PUBLICATIONS

International Search Report and Written Opinion in International Application No. PCT/IB2020/054448, dated Aug. 14, 2020, 9 pages.

Non-Final Office Action in U.S. Appl. No. 15/657,613, dated Oct. 5, 2018, 12 pages.

Final Office Action in U.S. Appl. No. 15/657,613, dated Mar. 8, 2019, 10 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation Test in Europe, Mar. 14, 2016, pp. 1393-1398.

Notice of Allowance in U.S. Appl. No. 16/234,956, dated May 5, 2020, 10 pages.

"BlackBerry QNX Platform for Instrument Clusters", BlackBerry QNX, 2018, 4 pages, https://blackberry.qnx.com/content/dam/qnx/products/instrument-clusters/instrument-clusters-product-brief.pdf [Retrieved Jun. 17, 2019].

Zander, Justyna, "Functional Safety for Autonomous Driving", IS T Symposium on Electronic Imaging 2017; Autonomous Vehicles and Machines 2017, Jan. 29-Feb. 2, 2017, 29 pages, Nvidia, https://www.imaging.org/Site/PDFS/Conferences/ElectroincImaging/EI2018/NVidia_JustynaZander_Imaging2017_Keynote.pdf. [Retrieved Jan. 22, 2021].

International Search Report and Written Opinion in International Application No. PCT/IB2020/054645, dated Aug. 21, 2020, 8 pages.

* cited by examiner

US 11,210,199 B2

SAFETY MONITOR FOR INVALID IMAGE TRANSFORM

BACKGROUND

Description of the Related Art

In a common deployment of a computer vision algorithm, a software application supplies a computer vision (CV) graph to a CV accelerator hardware engine. The CV graph defines a plurality of image processing functions that should be performed to transform an input image or each frame of a stream of video frames. In one implementation, these image processing functions are defined by the nodes of a directed acyclic graph (DAG). The CV graph can be designed to be compliant with any of various frameworks (e.g., the OpenVX framework). When the CV accelerator is operating in a safety-critical environment, it is desired to monitor the CV accelerator to check for abnormal behavior. A typical implementation for monitoring the CV accelerator inserts monitoring logic into the CV accelerator processing hardware sub-blocks. For example, a machine check architecture is a mechanism whereby monitoring logic in the processing hardware checks for abnormal behavior. However, this approach, while providing monitoring in the lower levels of hardware, may overlook failure only observable at the output of the CV accelerator. Nor will this approach detect random intermittent faults at the CV graph level.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
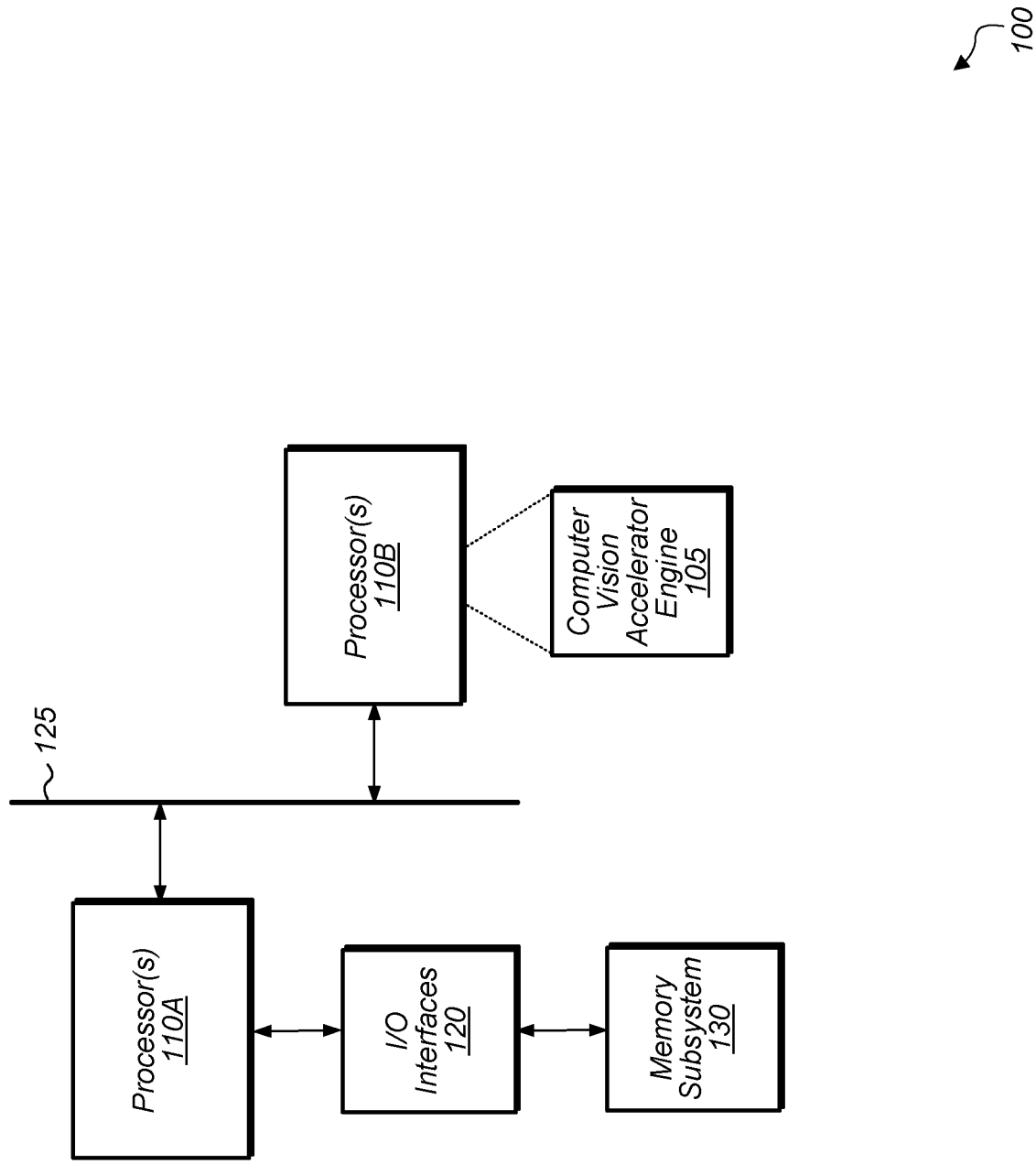
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a safety monitor framework for a safety-critical computer vision application are disclosed herein. In one implementation, a system includes a safety-critical computer vision application, a safety monitor, and a computer vision accelerator engine. The safety monitor receives an input image, test data (e.g., test vectors), and a computer vision graph from the safety-critical computer vision application. In one implementation, the test data includes a list of known images and corresponding output images and meta-information defined by the output nodes in the computer vision graph. In one implementation, the safety monitor modifies the input image to add additional objects outside of the boundaries of the input image. In such an embodiment, the modified image is larger than the input image to accommodate the additional objects outside of the boundaries of the original image. In one implementation, the configuration of the modified image (i.e., where the extra space and additional objects are inserted) is stored in a data structure (i.e., metadata) that is conveyed through the system flow with the modified image.

In one implementation, the additional objects include one or more redundant objects that are identical to objects found in a previous input image. In another implementation, the additional objects include one or more objects which were provided in the test vectors. The safety monitor provides the modified image to the computer vision accelerator. The computer vision accelerator processes the modified image and provides outputs back to the safety monitor. Based on the outputs generated by the computer vision accelerator, the safety monitor determines the likelihood of erroneous processing of the original input image. In one implementation, the safety monitor compares a known good result to the outputs which are associated with the modifications to determine the likelihood of erroneous processing of the original input image. The safety monitor provides an indicator of the likelihood of erroneous processing to the safety-critical application. With this approach, the safety monitor complements the overall fault coverage and protects against faults only observable at the level of the computer vision graph.

Referring now to FIG. 1, a block diagram of one implementation of a computing system 100 is shown. In one implementation, computing system 100 includes at least processor(s) 110A-B, input/output (I/O) interfaces 120, bus 125, and memory subsystem 130. In other implementations, computing system 100 can include other components and/or computing system 100 can be arranged differently. In one implementation, computer vision accelerator engine 105 is implemented on processor(s) 110B. Computer vision accelerator engine 105 is representative of any combination of software, firmware, and/or hardware for implementing various computer vision algorithms or computer vision models on processor(s) 110B.

Computer vision accelerator engine 105 can be used by any of a variety of different safety-critical applications which vary according to the implementation. For example, in one implementation, computer vision accelerator engine 105 is used in an automotive application. For example, computer vision accelerator engine 105 controls one or more functions of a self-driving vehicle (i.e., autonomous vehicle), driver-assist vehicle, or advanced driver assistance system. In other implementations, computer vision accelerator engine 105 is trained and customized for other types of use cases. Depending on the implementation, computer vision accelerator engine 105 generates an image-based output or a non-image-based output.

Processors(s) 110A-B are representative of any number and type of processing units (e.g., central processing unit (CPU), graphics processing unit (GPU), digital signal processor (DSP), field programmable gate array (FPGA), application specific integrated circuit (ASIC)). In one implementation, at least a portion of the processing associated with computer vision accelerator engine 105 is performed by processor(s) 110B. Additionally, computer vision accelerator engine 105 is implemented using any of these types of processing units and/or other types of processing elements. Memory subsystem 130 includes any number and type of memory devices. For example, the type of memory in memory subsystem 130 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. Memory subsystem 130 is accessible by computer vision accelerator engine 105 and processor(s) 110A-B. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. In some implementations, computing system 100 is integrated within a robotic system, self-driving vehicle, autonomous drone, surgical tool, or other types of mechanical devices or systems. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
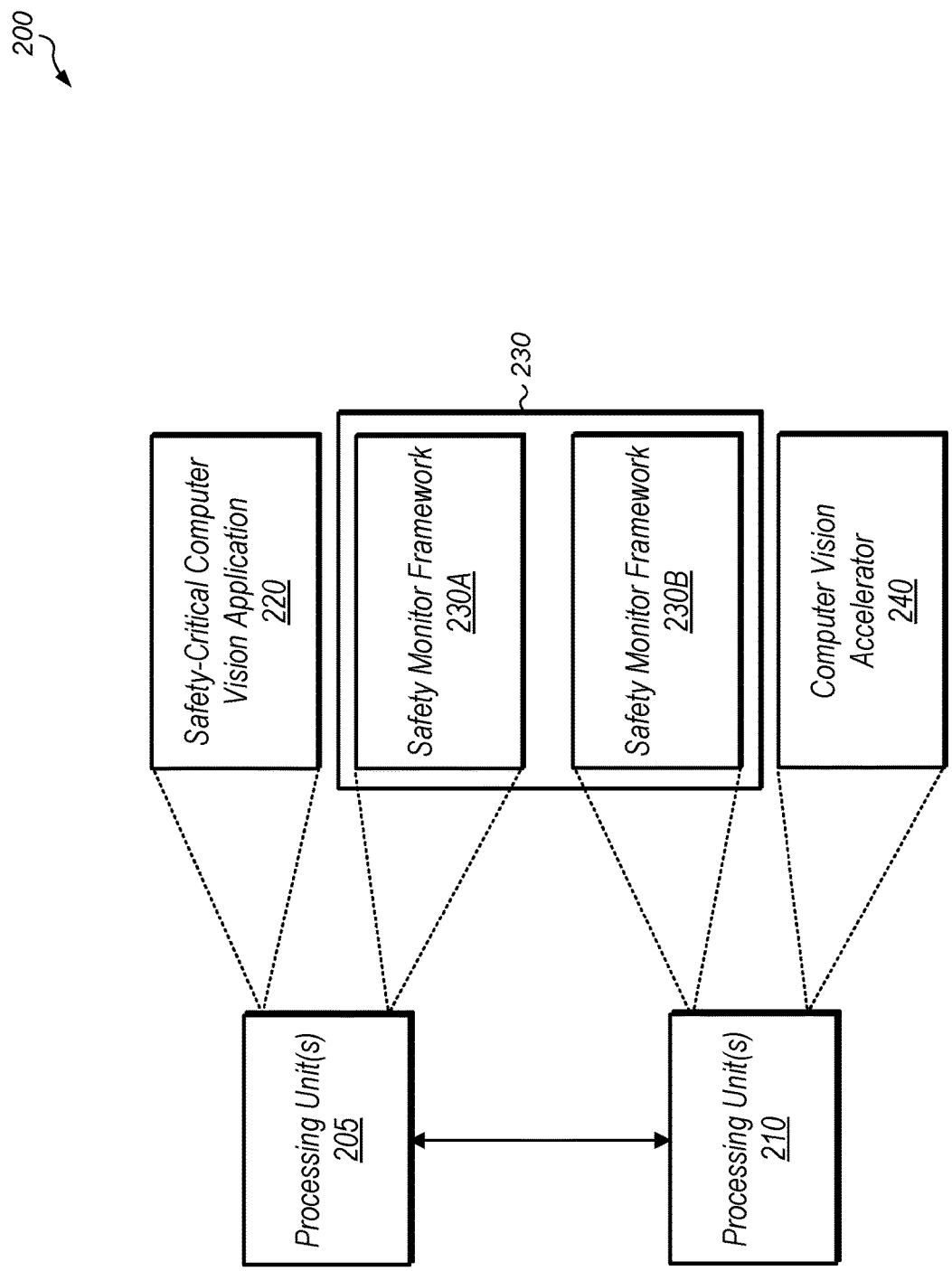
FIG. 2 is a block diagram of one implementation of a safety-critical computer vision application executing in a safety-critical system.

Turning now to FIG. 2, a block diagram of one implementation of a safety-critical computer vision application 220 executing in a safety-critical system 200 is shown. In one implementation, safety-critical system 200 includes at least processing unit(s) 205 and 210 which are representative of any number and type of processing units. It is noted that safety-critical system 200 can also include any number of other components which are not shown to avoid obscuring the figure. In one implementation, processing unit(s) 205 includes one or more central processing units (CPUs). In other implementations, processing unit(s) 205 can include other types of processing units. In one implementation, processing unit(s) 210 include one or more graphics processing unit (GPUs). In other implementations, processing unit(s) 210 can include other types of processing units (e.g., digital signal processors (DSPs), field programmable gate arrays (FPGAs), application specific integrated circuits (ASICs)).

In one implementation, safety-critical computer vision application 220 executes on processing unit(s) 205. Safety-critical computer vision application 220 is representative of any type of software application that executes in a hazardous environment where safety is of high importance. For example, in one implementation, safety-critical computer vision application 220 controls a self-driving or driver-assisted automobile or other vehicle. In other implementations, safety-critical computer vision application 220 operates within a robot, as the auto-pilot control mechanism in an airplane, or as part of other systems in various challenging, high-risk environments.

In one implementation, a first portion of safety monitor framework 230 (i.e., safety monitor framework 230A) executes on processing unit(s) 205 and a second portion of safety monitor framework 230 (i.e., safety monitor framework 230B) executes on processing unit(s) 210. In other implementations, safety monitor framework 230 executes entirely on processing unit(s) 205 or entirely on processing unit(s) 210. Computer vision accelerator 240 is representative of any combination of software and/or hardware that is used to implement one or more computer vision algorithms and/or computer vision models. In one implementation, computer vision accelerator 240 operates according to a computer vision (CV) graph provided by safety-critical computer vision application 220. In one implementation, computer vision accelerator 240 is implemented using dedicated hardware (e.g., FPGA, ASIC, IP core). In another implementation, computer vision accelerator 240 includes software instructions that are designed to execute on processing unit(s) 210. In other implementations, computer vision accelerator 240 can be any suitable combination of software and/or hardware.

In one implementation, safety-critical computer vision application 220 provides images to be processed by computer vision accelerator 240. In one implementation, safety monitor framework 230 receives inputs that are being sent to computer vision accelerator 240 from safety-critical computer vision application 220. In one implementation, safety monitor framework 230 modifies one or more of these inputs and then sends the modified inputs to safety-critical computer vision application 220. After computer vision accelerator 240 has processed the modified inputs, computer vision accelerator 240 sends the processing results to safety-critical computer vision application 220 via safety monitor framework 230. Safety monitor framework 230 analyzes the results to determine if computer vision accelerator 240 is malfunctioning. In one implementation, safety monitor framework 230 generates a confidence indicator which specifies how confident safety monitor framework 230 is that computer vision accelerator 240 accurately processed the inputs generated by safety-critical computer vision application 220. Safety monitor framework 230 conveys the confidence indicator and a modified version of the processing results to safety-critical computer vision application 220. In one implementation, safety-critical computer vision application 220 takes one or more corrective actions (e.g., shutting down, rebooting the system, retrying the same image, generating a warning signal for a user, reducing speed of the vehicle, changing an operating mode) if the confidence indicator does not meet a threshold. In some embodiments, not meeting the threshold means the confidence indicator is below the threshold. In other embodiments, not meeting the threshold means the confidence indicator is above the threshold.

Figure 3:
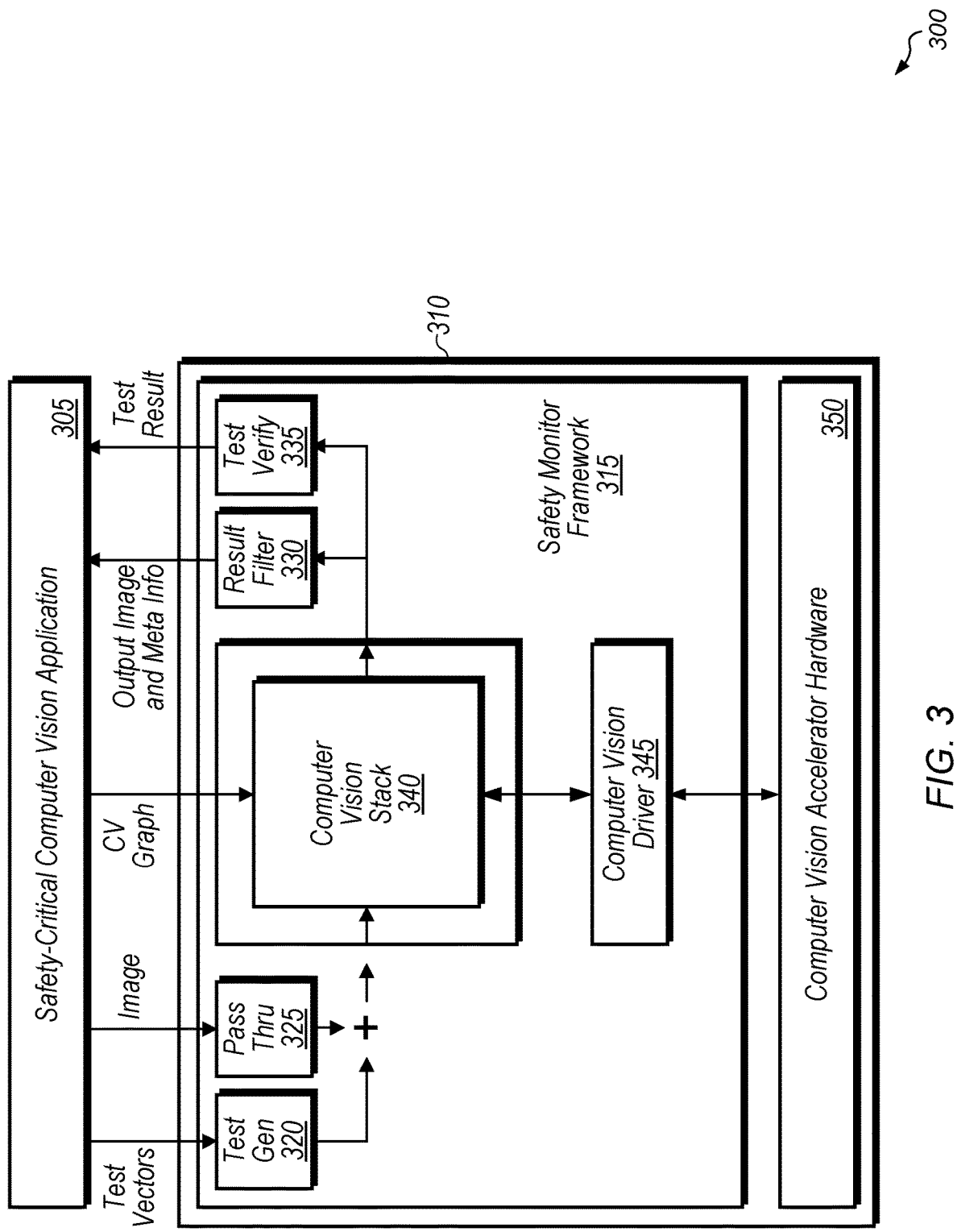
FIG. 3 is a block diagram of one implementation of a computer vision fault detection framework.

Referring now to FIG. 3, a block diagram of one implementation of a computer vision fault detection system (or "framework") 300 is shown. In one implementation, a computing system 310 includes a safety monitor framework 315 and computer vision accelerator hardware 350. In various implementations, computer vision accelerator hardware 350 includes hardware and/or software that is specialized for the purpose of accelerating computer visions processing tasks. In other implementations, general purpose hardware and/or software may be used (e.g., added to the system) in order to speed processing of computer vision related processing tasks. In one implementation, safety monitor framework 315 includes a test generation unit 320, pass through unit 325, result filter 330, test verify unit 335, computer vision stack 340, and computer vision driver 345. In other implementations, safety monitor framework 315 includes other components and/or is arranged in other suitable manners. In one implementation, safety monitor framework 315 is designed to be compliant with the automatic safety integrity level (ASIL) risk classification scheme. In other implementations, safety monitor framework 315 can be designed to comply with other risk classification schemes in other types of environments.

In one implementation, a safety-critical computer vision application 305 conveys computer image related data to safety monitor framework 315. In various implementations, such image related data include an image, test vectors, and a computer vision (CV) graph. Other implementations may include different and/or other data. In one implementation, safety-critical computer vision application 305 describes a computer vision algorithm, in the form of a binary graph, for computer vision accelerator hardware 350 to execute. In one implementation, computer vision accelerator hardware 350 contains hardware primitives to speed up processing of the specified computer vision algorithm. The algorithm transforms input images according to the specified binary graph. In various implementations, the algorithm's output result is a transformed image and/or metadata indicating features found within the input image.

In one implementation, the test vectors are received and used by test generation unit 320 to determine which objects to add to the original image. The test vectors are also used to determine whether the results generated by computer vision accelerator hardware 350 are accurate. In one implementation, a redundant object is added to the original image, with the redundant object being identical to an object present in a previous image. In another implementation, a given object which was not present in a previous image is added to the original image. For example, in one implementation, the given object is an object that was identified in the test vectors as being a known good object in one or more test images. As used herein, a "known good object" is defined as an object which has a high probability of being correctly identified or processed in a consistent manner by computer vision accelerator hardware 350. The known good objects and the corresponding objects, collectively known as test vectors, are typically generated by testers and/or a domain expert to provide good coverage of the specific algorithm or use cases being implemented. These test vectors are used to validate the correctness of the algorithm, in terms of both hardware and software, in a controlled environment. Any failures detected on these known good test vectors would indicate problems in the overall flow, caused by software/hardware installation issues and/or software/hardware malfunction or other issues. In one implementation, the given object that is added to the original image is chosen based at least in part on having a high probability of occurring in the images being processed. Test generation unit 320 adds one or more extra given object(s) to the original image to create a modified image. The computer vision stack 340 conveys the modified image and the CV graph to the computer vision accelerator hardware 350. In one implementation, the modified image and the CV graph are conveyed to the computer vision accelerator hardware 350 via computer vision driver 345.

The computer vision accelerator hardware 350 processes the modified image according to the provided CV graph, and then the computer vision accelerator hardware 350 returns the processing results to computer vision stack 340. In various implementations, computer vision accelerator hardware 350 performs a variety of functions that include (but are not limited to) image color conversion, pixel-wise image operations, image scaling and filtering, Gaussian and Laplacian pyramids, histogram and statistical operations, tensor operations, classification, feature detection, tracking, control flow operations, convolution, deconvolution, fully connected layers, maximum pooling, average pooling, activations, local response normalization, softmax, region of interest pooling, and others. In one implementation, these functions are specified as nodes in a compute graph which is dispatched from safety-critical computer vision application 315 to computer vision accelerator hardware 350. Computer vision accelerator hardware 350 organizes the hardware and/or firmware to optimize for the specified graph. The hardware can include one or more digital signal processors, blocks optimized for each of the above operations, specialized vector compute units, and/or other units.

In one implementation, result filter 330 analyzes the results and also filters the results to remove any extra objects that were added to the original image. Result filter 330 conveys filtered results and meta information to application 305. The meta information can include any type of data with the type varying according to the implementation. For example, in one implementation, if application 305 is looking for the number of objects in the original image, then the meta information will include the number of objects and their locations within the original image. In other implementations, other data can be conveyed in the meta information depending on what application 305 is searching for in the original image or the type of transform being performed on the original image.

In one implementation, the results from computer vision accelerator hardware 350 are analyzed by test verify unit 335. Test verify unit 335 determines whether the extra object(s) added to the original image were correctly processed and/or classified by the computer vision accelerator hardware 350. In one implementation, for an image output node, test verify unit 335 will compare the transformed test image with a known good result. For a non-image output node, the test verify unit 335 will use at least one of the following techniques in accordance with one or more implementations. For a histogram, the test verify unit 335 will use histogram test vectors to determine the likelihood of error in the resulting bin and return an adjusted histogram (without the test vector effect) to the application. For a remap operation, the test verify unit 335 will use a remap test vector and corresponding known remap function to verify if the remapped image is correct. For an optical flow, the test verify unit 335 will use optical flow test vectors for two input frames and verify that the calculated optical flow is correct. For an integral operation, the test verify unit 335 will perform verification by subtracting the integral of the main image from the modified image and compare with the expected output provided as part of the test data. For a feature extraction operation, the test verify unit 335 will return the adjusted feature set (without the test vector effect) to the application. In other implementations, the test verify unit 335 can use other suitable techniques for verifying the results of the various types of output nodes.

If test verify unit 335 determines that computer vision accelerator hardware 350 correctly processed the known good objects, then test verify unit 335 returns a passing test result indicator to application 305. For example, in one implementation, if the padded area with the known good objects is transformed into the expected test vector output or equivalent metadata, then the calculation by computer vision accelerator hardware 350 is considered correct. Otherwise, if the known good objects were processed incorrectly, then test verify unit 335 returns a failing test result indicator to application 305. In response to receiving the failing test result indicator, application 305 can take any of various corrective actions (e.g., reboot, generate error, replay the same image).

Figure 4:
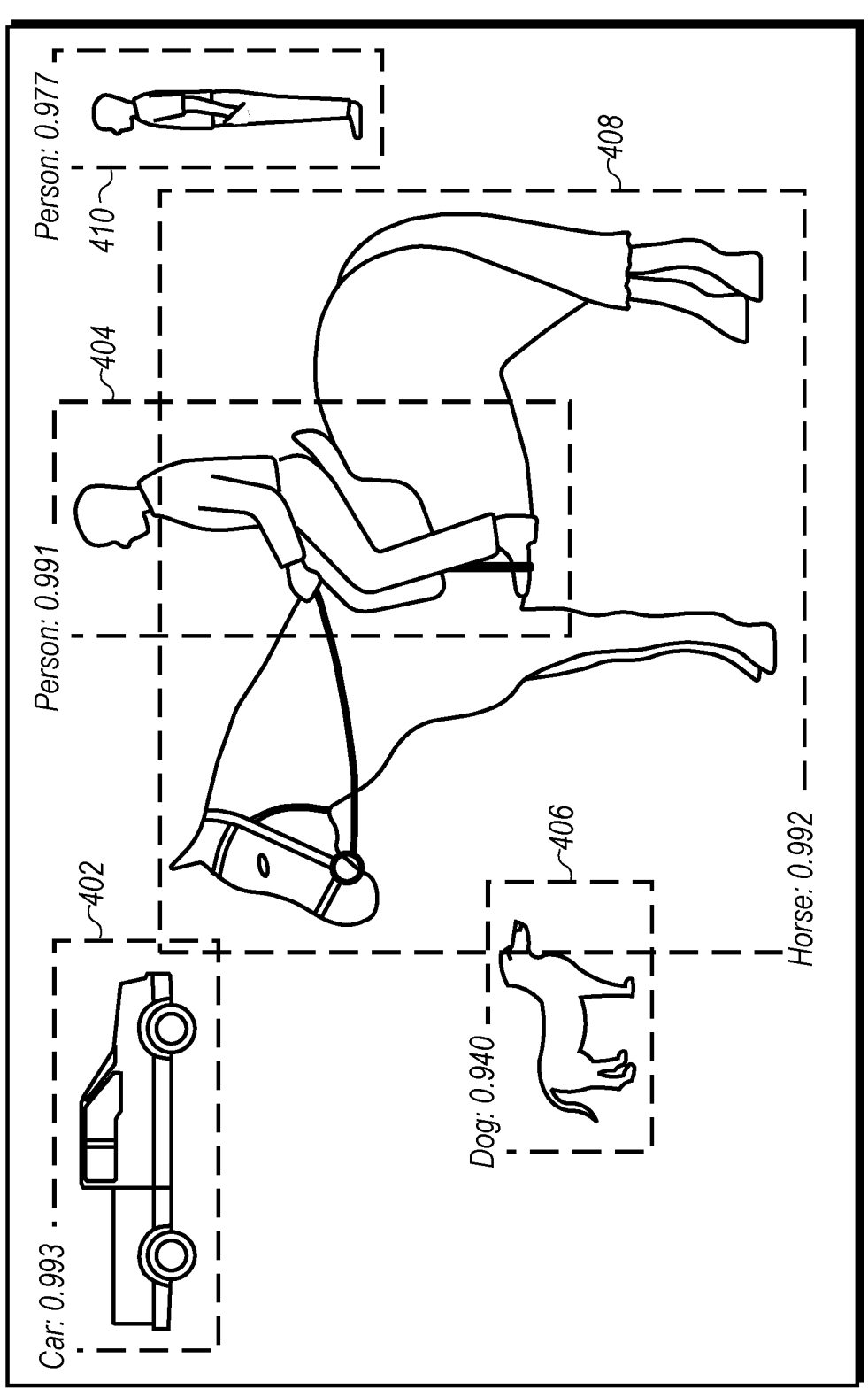
FIG. 4 is an example of an image which is sent from a safety-critical application to a safety monitor framework in accordance with one implementation.

Turning now to FIG. 4, an example of an image 400A which is sent from a safety-critical application to a safety monitor framework in accordance with one implementation is shown. In the example shown in FIG. 4, image 400A includes a truck 402, a person 404, a dog 406, a horse 408, and another person 410. It should be understood that this example of image 400A including these objects is merely indicative of one particular implementation. The likelihood of detection and correct identification is also shown on the top of the dashed box surrounding each identified object. In one implementation, these probabilities are determined during a training phase of the target computer vision accelerator engine. In one implementation, these probabilities are provided in the test data that the safety-critical application provides to the safety monitor framework for the particular CV graph and/or for the target computer vision accelerator engine that is processing the image.

Figure 5:
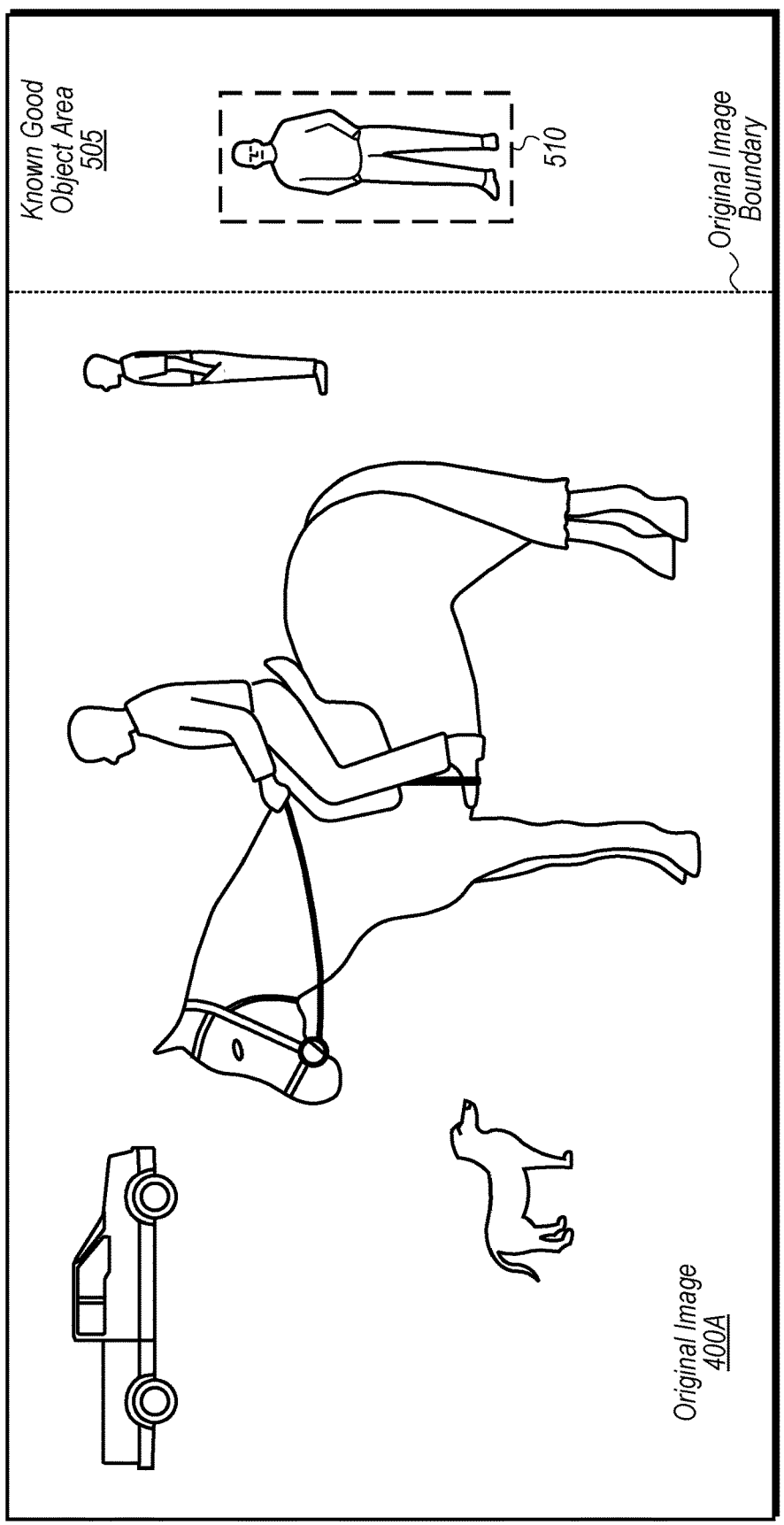
FIG. 5 is a modified image that has been generated by a safety monitor framework from an original image in accordance with one implementation.

Referring now to FIG. 5, a modified image 400B that has been generated by a safety monitor framework from an original image 400A in accordance with one implementation is shown. Modified image 400B is intended to represent image 400A (of FIG. 4) after being modified by a safety monitor framework (e.g., safety monitor framework 315 of FIG. 3). As shown, modified image 400B includes the original image 400A along with a known good object area 505 which has been added to the modified image 400B outside the boundaries (on the right side) of the original image 400A. The area of original image 400A on the left-side of modified image 400B remains unchanged. Accordingly, the original image 400A portion of modified image 400B includes all of the original objects as they appeared in image 400A (of FIG. 4).

In one implementation, known good object area 505 includes person 510 which is representative of a known good object found in one of the test vector images. In other implementations, known good object area 505 can include other numbers and/or types of objects. Depending on the implementation, the objects shown in known good object area 505 can include redundant objects which are exact replicas of objects in the original image and/or new objects which are not included as part of the original image 400A. Additionally, while known good object area 505 is shown on the right-side of modified image 400B, it should be understood that this is merely intended to represent one particular implementation. In other implementations, known good object area 505 can be added on top, on the left, and/or on the bottom of the original image 400A. In some implementations, a portion of the original image is used as a known good object area 505. For example, if a portion of the image is deemed non-essential for some reason (e.g., it is determined that image content in the particular area has no functional effect on the processing results), then that particular area can be used as a known good object area.

After generating modified image 400B, the safety monitor framework conveys the modified image 400B to the computer vision accelerator engine (e.g., computer vision accelerator hardware 350 of FIG. 3). The computer vision accelerator engine processes modified image 400B and then conveys outputs based on this processing to the safety monitor framework. The safety monitor framework determines if the objects added to known good object area 505 were identified and/or processed in accordance with the previously provided test data. If these added objects were correctly identified and/or processed properly, then the safety monitor framework provides a passing indicator to the safety-critical application. The safety monitor framework also filters the processing results related to the original image 400A by excluding the objects in known good object area 505. Then, the safety monitor framework provides these filtered results to the safety-critical application.

On the other hand, if the added objects were incorrectly identified and/or processed erroneously, then the safety monitor framework provides a failing indicator to the safety-critical application. In response to receiving the failing indicator, the safety-critical application takes one or more corrective applications. For example, in one implementation, the safety-critical application terminates in response to receiving the failing indicator. In another implementation, in response to receiving the failing indicator, the safety-critical application generates the same frame to be reprocessed by the computer vision accelerator engine. In other implementations, the safety-critical application performs other actions in response to receiving the failing indicator.

Figure 6:
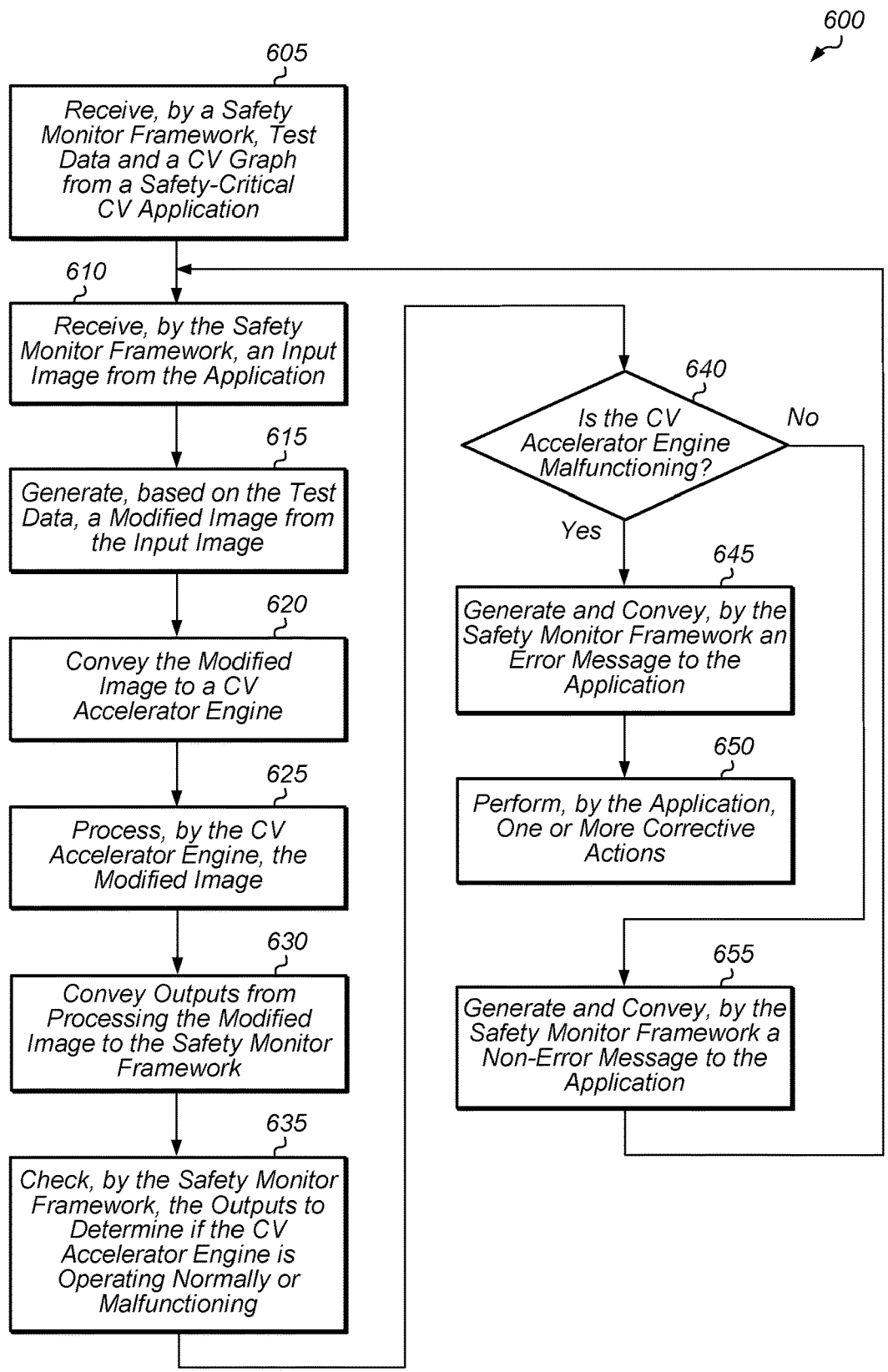
FIG. 6 is a generalized flow diagram illustrating one implementation of a method for operating a safety monitor framework for a computer vision accelerator.
Figure 7:
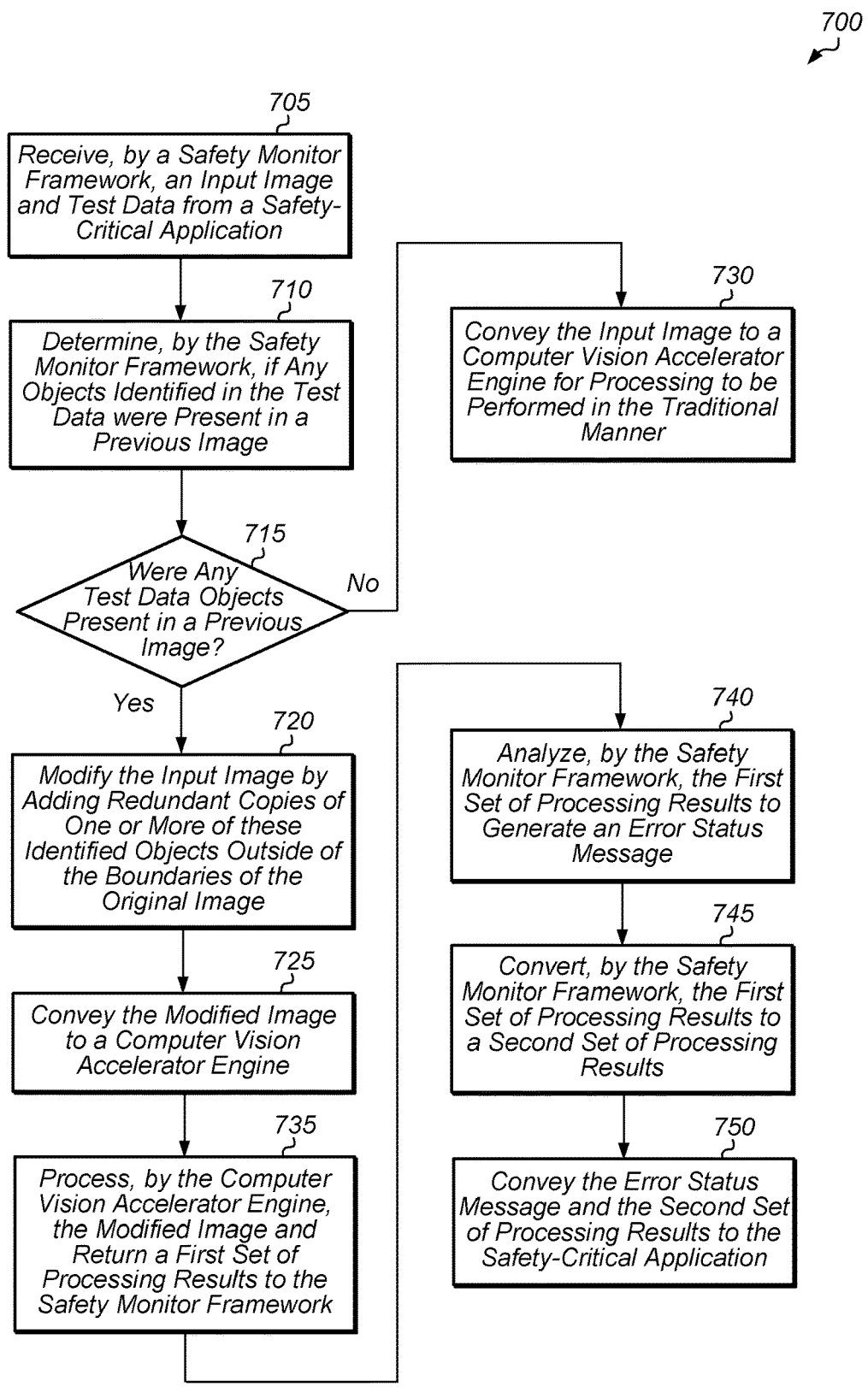
FIG. 7 is a generalized flow diagram illustrating one implementation of a method for implementing a safety monitor framework.
Figure 8:
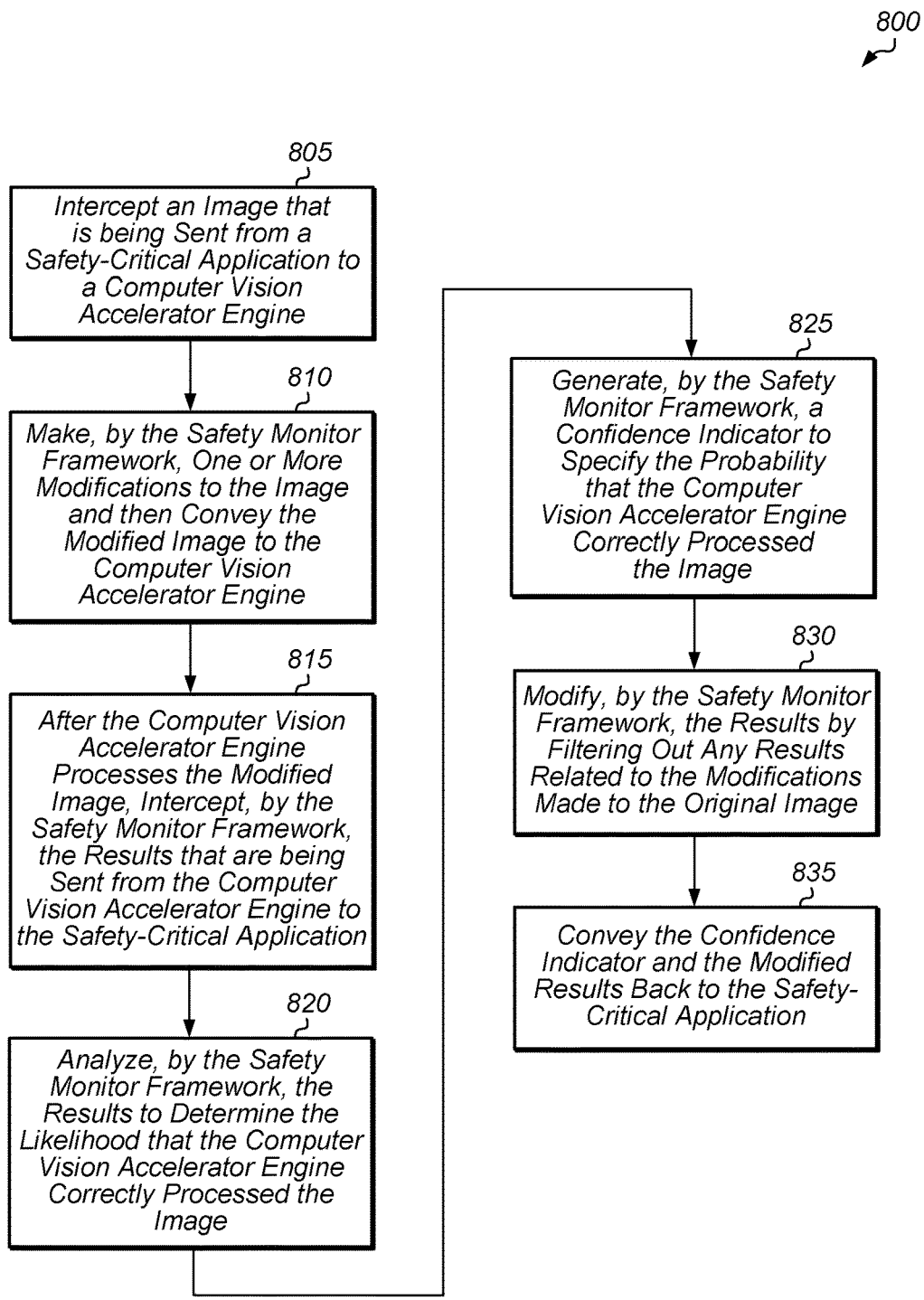
FIG. 8 is a generalized flow diagram illustrating one implementation of a method for generating a confidence indicator for use by a safety-critical application.

Turning now to FIG. 6, one implementation of a method 600 for operating a safety monitor framework for a computer vision accelerator is shown. For purposes of discussion, the steps in this implementation and those of FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A safety monitor framework receives test data and a computer vision (CV) graph from a safety-critical computer vision application (block 605). The test data can include training information, test vectors, and/or other metadata. In some cases, the test data is supplied or received ahead of time by the safety monitor framework prior to the initiation of method 600. In one implementation, the test vectors include objects that have been previously identified and/or have a high probability of being identified in the images being processed. Also, the safety monitor framework receives an input image from the safety-critical computer vision application (block 610). In one implementation, the input image is a real image that needs to be processed for a real-time application. Next, the safety monitor framework generates, based on the test data, a modified image from the input image (block 615). In one implementation, the modified image includes the input image with one or more extra objects added outside of the boundaries of the input image. For example, in one implementation, the safety monitor framework detects a first object within a previous input image. In this implementation, if the first object has been identified in the test data as having more than a threshold probability of being identified by a computer vision accelerator engine, then the safety monitor framework adds the first object in a space outside of the original input image. In this example, the modified image includes the original input image as well as the first object. It is noted that any number of objects can be added to an area outside of the original input image. The modified image is created from the combination of the original input image and the extra area.

Then, the safety monitor framework conveys the modified image to a computer vision accelerator engine (block 620). Next, the computer vision accelerator engine processes the modified image (block 625). It is noted that the computer vision accelerator engine is not aware that the original image has been modified. Accordingly, the computer vision accelerator engine performs normal processing as if the image had been received directly and without modification from the safety-critical application. Then, the computer vision accelerator engine conveys outputs from processing the modified image to the safety monitor framework (block 630). The safety monitor framework checks the outputs to determine if the computer vision accelerator engine is operating normally or malfunctioning (block 635). For example, if the extra object(s) added to the modified image are processed in the expected manner, then the safety monitor framework concludes that the computer vision accelerator engine is operating normally. Otherwise, if the results from the computer vision accelerator engine processing the extra object(s) are unexpected and/or do not match the results from the identical object(s) in the original image portion of the modified image, then the safety monitor framework concludes that the computer vision accelerator engine is malfunctioning.

If the safety monitor framework determines that the computer vision accelerator engine is malfunctioning (conditional block 640, "yes" leg), then the safety monitor framework generates and conveys an error message to the safety-critical computer vision application (block 645). The safety monitor framework can also provide other outputs from the computer vision accelerator engine to the safety-critical application in block 645. In response to receiving the error message, the safety-critical application performs one or more corrective actions (block 650). It is noted that the safety-critical application can optionally decide to continue sending subsequent images to the computer vision accelerator engine for processing in some cases, depending on the type of error that is detected and/or the current status of the safety-critical application. Alternatively, the safety-critical application can decide to terminate in response to receiving the error message. If the safety monitor framework determines that the computer vision accelerator engine is functioning normally (conditional block 640, "no" leg), then the safety monitor framework generates and conveys a non-error message to the safety-critical application (block 655). The safety monitor framework can also provide other outputs (e.g., filtered results) from the computer vision accelerator engine to the safety-critical application in block 655. In response to receiving the non-error message, the safety-critical application provides another image to the safety monitor framework and then method 600 returns to block 610.

Referring now to FIG. 7, one implementation of a method 700 for implementing a safety monitor framework is shown. A safety monitor framework receives an input image and test data from a safety-critical application (block 705). The safety monitor framework determines if any objects identified in the test data were present in a previous image (block 710). It is assumed for the purposes of this discussion that the input image is part of a continuous sequence of images, such as a camera input stream. If any of the one or more objects identified by the test data were present in a previous image (conditional block 715, "yes" leg), then the safety monitor framework modifies the input image by adding redundant copies of one or more of these identified objects outside of the boundaries of the original image (block 720). Then, the safety monitor framework conveys the modified image to a computer vision accelerator engine (block 725). If none of the objects identified by the test data were present in a previous image (conditional block 715, "no" leg), then the safety monitor framework passes the input image to the computer vision accelerator engine with processing to be performed in the traditional manner (block 730). After block 730, method 700 ends.

After block 725, the computer vision accelerator engine processes the modified image and returns a first set of processing results to the safety monitor framework (block 735). The safety monitor framework analyzes the first set of processing results to generate an error status message (block 740). It is noted that the error status message refers to the error status, or likelihood thereof, of the computer vision accelerator engine. In one implementation, the error status message is a single bit which indicates that the computer vision accelerator engine is either functioning normally or malfunctioning. The safety monitor framework also converts the first set of processing results to a second set of processing results (block 745). In one implementation, the safety monitor framework converts the first set of processing results to the second set of processing results by removing, from the first set of processing results, any result data associated with the modifications to the original image. In other words, the second set of processing results are what the processing results would look like if the original image, rather than the modified image, had been processed by the computer vision accelerator engine. Next, the safety monitor framework conveys the error status message and the second set of processing results to the safety-critical application (block 750). After block 750, method 700 ends.

Turning now to FIG. 8, one implementation of a method 800 for generating a confidence indicator for use by a safety-critical application is shown. A safety monitor framework intercepts an image that is being sent from a safety-critical application to a computer vision accelerator engine (block 805). In one implementation, the safety monitor framework is interposed between the safety-critical application and the computer vision accelerator engine. In one implementation, neither the safety-critical application nor the computer vision accelerator engine are aware that the safety monitor framework is interposed between them. However, in other implementations, the safety-critical application and/or the computer vision accelerator engine are aware that the safety monitor framework is located in between them. The safety monitor framework makes one or more modifications to the image and then conveys the modified image to the computer vision accelerator engine (block 810). In one implementation, the one or more modifications include adding one or more extra objects to a space outside of the original image. For a video stream, one way to improve the confidence level in the case of object identification is to embed one similar object and one dissimilar object into the extra space in the next video frame (assuming the object is still in the next capture frame in close temporal distance).

After the computer vision accelerator engine processes the modified image, the safety monitor framework intercepts the results that are being sent from the computer vision accelerator engine to the safety-critical application (block 815). The safety monitor framework analyzes the results to determine the likelihood that the computer vision accelerator engine correctly processed the image (block 820). For example, in one implementation, the safety monitor framework determines whether the results indicate an invalid transform or invalid feature extraction was performed. If the results from processing modifications to the image are not consistent with the results provided with the test data, then the safety monitor framework would conclude that there is a relatively high likelihood that the computer vision accelerator incorrectly processed the original input image. In one implementation, a relatively high likelihood that the computer vision accelerator incorrectly processed the image is expressed with a relatively low (i.e., close to zero) confidence indicator.

Next, the safety monitor framework generates a confidence indicator to specify the probability that the computer vision accelerator engine correctly processed the image (block 825). Also, the safety monitor framework modifies the results by filtering out any results related to the modifications made to the original image (block 830). Then, the safety monitor framework conveys the confidence indicator and the modified results back to the safety-critical application (block 835). After block 835, method 800 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a computer vision accelerator engine; and
a safety monitor configured to:
receive, via a computing interface, an input image and test data from a safety-critical application;
generate a modified image by combining one or more given objects with the input image;
convey the modified image to the computer vision accelerator engine; and
generate a confidence indicator based on an analysis of results generated by the computer vision acceleration engine processing the modified image, wherein the confidence indicator represents a probability that the computer vision accelerator engine is operating correctly.

2. The system as recited in claim 1, wherein the system is configured to perform one or more corrective actions in response to the confidence indicator not meeting a threshold.

3. The system as recited in claim 2, wherein the one or more corrective actions comprise terminating the safety-critical application.

4. The system as recited in claim 1, wherein:
the test data indicates how the one or more given objects should be processed by the computer vision accelerator; and
the safety monitor is configured to analyze the results to determine if the one or more given objects were processed correctly.

5. The system as recited in claim 1, wherein the safety monitor is further configured to:
analyze a previous input image to detect at least one known good object;
add a redundant version of the at least one known good object to extra space outside of original boundaries of the input image; and
create the modified image from the input image and the extra space.

6. The system as recited in claim 1, wherein the safety monitor is further configured to:
receive a first set of output data from the computer vision accelerator engine;
convert the first set of output data to a second set of output data; and
convey the second set of output data to the safety-critical application executing on the one or more processors.

7. The system as recited in claim 1, wherein the confidence indicator specifies whether the computer vision accelerator engine passed or failed verification of the results, and wherein the one or more given objects are selected based on the test data received from the safety-critical application.

8. A method comprising:
receiving via a computing interface, by a safety monitor, an input image and test data from a safety-critical application;
generating, by the safety monitor, a modified image by combining one or more given objects with the input image;
conveying the modified image to a computer vision accelerator engine comprising circuitry;
generating, by the safety monitor, a confidence indicator based on an analysis of results generated by the computer vision acceleration engine processing the modified image, wherein the confidence indicator represents a probability that the computer vision accelerator engine is operating correctly.

9. The method as recited in claim 8, wherein the confidence indicator being below a threshold indicates that the computer vision accelerator engine is malfunctioning.

10. The method as recited in claim 8, wherein the one or more corrective actions comprise terminating the safety-critical application.

11. The method as recited in claim 8, further comprising analyzing, by the safety monitor, the results to determine if the one or more given objects were processed correctly, wherein the test data indicates how the one or more given objects should be processed by the computer vision accelerator.

12. The method as recited in claim 8, further comprising:
analyzing, by the safety monitor, a previous input image to detect at least one known good object; and
adding, by the safety monitor, a redundant version of the at least one known good object to extra space outside of original boundaries of the input image; and
creating, by the safety monitor, the modified image from the input image and the extra space.

13. The method as recited in claim 8, further comprising:
receiving, by the safety monitor, a first set of output data from the computer vision accelerator engine; and
converting, by the safety monitor, the first set of output data to a second set of output data; and
conveying, by the safety monitor, the second set of output data to the safety-critical application.

14. The method as recited in claim 8, wherein the confidence indicator specifies whether the computer vision accelerator engine passed or failed verification of the results, and wherein the one or more given objects are selected based on the test data received from the safety-critical application.

15. An apparatus comprising:
a memory storing program instructions; and
at least one processor coupled to the memory, wherein the program instructions are executable by the at least one processor to:
receive, via a computing interface, an input image and test data from a safety-critical application executing on the one or more processing units;
generate a modified image by combining one or more given objects with the input image;
convey the modified image to a computer vision accelerator engine;
generate a confidence indicator based on an analysis of results generated by the computer vision acceleration engine processing the modified image, wherein the confidence indicator represents a probability that the computer vision accelerator engine is operating correctly; and
perform one or more corrective actions in response to the confidence indicator being below a threshold.

16. The apparatus as recited in claim 15, wherein the confidence indicator being below a threshold indicates that the computer vision accelerator engine is malfunctioning.

17. The apparatus as recited in claim 15, wherein the one or more corrective actions comprise terminating a safety-critical application.

18. The apparatus as recited in claim 15, wherein the program instructions are further executable by the at least one processor to analyze the results to determine if the one or more given objects were processed correctly, wherein the test data indicates how the one or more given objects should be processed by the computer vision accelerator.

19. The apparatus as recited in claim 15, wherein the program instructions are further executable by the at least one processor to:
analyze a previous input image to detect at least one known good object;
add a redundant version of the at least one known good object to extra space outside of original boundaries of the input image; and
create the modified image from the input image and the extra space.

20. The apparatus as recited in claim 15, wherein the program instructions are further executable by the at least one processor to:
receive a first set of output data from the computer vision accelerator engine; and
convert the first set of output data to a second set of output data.

* * * * *